United States Patent [19]

Morgott

[11] 3,818,393

[45] June 18, 1974

[54] CONTROL UNIT FOR ELECTRONIC SYSTEM

[75] Inventor: Horst Morgott, Munich, Germany

[73] Assignee: Siemens Aktiengesellschaft, Berlin and Munich, Germany

[22] Filed: Sept. 25, 1973

[21] Appl. No.: 400,514

[30] Foreign Application Priority Data

Sept. 25, 1972 Germany ............................ 2246930

[52] U.S. Cl. ................................................ 335/206
[51] Int. Cl. ....................... H01h 13/14, H01h 36/00
[58] Field of Search ...................... 335/205, 206, 207

[56] References Cited

UNITED STATES PATENTS 3,401,366 9/1968 Paholek et al. ...................... 335/206
3,403,363 9/1968 Pearse et al. ........................ 335/205
3,514,729 5/1970 Webb.................................. 335/207
3,636,485 1/1972 Weathers............................ 335/205
3,652,963 3/1972 Fox .................................... 335/205
3,652,964 3/1972 Chamberlain........................ 335/205

*Primary Examiner*—Roy N. Envall, Jr.
*Attorney, Agent, or Firm*—Hill, Gross, Simpson, Van Santen, Steadman, Chiara & Simpson

[57] ABSTRACT

A control unit for use in an electronic system such as a matrix-shaped control field characterized by the control unit having a housing supporting a circuit board on which control elements including at least two reed switches are mounted. A shaft is supported in the housing between the pair of reed switches and supports a permanent magnet which has two pairs of poles arranged in mirror symmetry to each other. The shaft is connected by a gear arrangement to external means such as a pushbutton to rotate the shaft and the magnet in a step-wise manner between positions opening the reed switches and positions closing the switches.

3 Claims, 4 Drawing Figures

CONTROL UNIT FOR ELECTRONIC SYSTEM

BACKGROUND OF THE INVENTION

1. Field of the Invention

The present invention is directed to a control unit utilizing a magnet for selectively opening and closing a pair of contacts.

2. Prior Art

In the U.S. Pat. Application, Ser. No. 310,765 filed on Nov. 30, 1972, now U.S. pat. No. 3,763,451 a control unit was disclosed which unit as adapted for insertion into a matrix-shaped control field of an electronic system or apparatus. The control unit comprises a circuit board which is received in a housing and which supported all electronic component elements which were necessary for one type of control function and the circuit board provides circuitry for the electronic component for connection to other units in the system. The control function included a pair of reed switches which were arranged in parallel relationship on the circuit board on opposite sides of a shaft which is mounted for rotation in the housing. A permanent magnet having a pair of poles is mounted on the shaft and is positioned with respect to a pole piece received in the housing and, the pole piece coacts with the magnet to hold it in predetermined angular position in the housing. The housing includes a device for rotating the shaft in a step-like manner which device includes a gear arrangement on the shaft which engaged a slide which extended from the housing to a pushbutton or other type of mechanical actuating device. The device rotates the shaft in a step-like manner to rotate the permanent magnet in a step-like manner between a position with the magnetic field closing the switch contacts by an inductive influence thereon to a second position in which the switch contacts are unaffected by the magnetic field of the magnet.

In many instances the plurality of these control units are utilized in electronic system and serve for switching on, controlling and monitoring the system. Therefore, the control units have various functions and serve for example, as indicator elements as keys, as switches and as toggle switches. In addition the operating conditions can also be indicated optically. These control units have been proven to be useful and since they can be assembled, as desired, in single or mosaic arrangements, to result in distinct control fileds, they can be easily exchanged because they can be easily removed or replaced. In addition, each of the control units is constructed of contact elements which have low bouncing or chattering characteristics and are thus chatter free. The control unit can be operated with little force which increases only insignificantly over the length of the feed path.

When the control units are constructed to be operative in a step-like manner as a rotary switch and are activated by pushbuttons or push switches, which may be released abruptly, the mechanical linkage for rotating the permanent magnet can result in a bounce back or jump in the linkage which may cause an undesirable double impulse. The undesirable bounce back or jump in the linkage occurs on releasing of the pushbutton or push switch and is due to the undampened jump back of the slide as it returns to the rest position. Experiments have shown the erroneous second impulse is not due to the bouncing back of the slide from its upper rest position which releases the movement of the pendulum of a control gear, but is due to a dampened building up transit process of a magnet during entering into a rest position relative to the pole piece and to the mass of the control gear which mass is accelerated by means of the bounce back of the slide. One attempt to correct this problem is to improve the dampening of the building up process of the magnet system which returns the magnet to the locking or rest position. This is accomplished by changes in the construction of the pole piece but has only resulted in an insignificant improvement.

SUMMARY OF THE INVENTION

The present invention provides an improved control unit in which undesirable double impulses during a switching operation are minimized. The improved control unit has a conductor means for supporting at least on inductively excitable switching means, a permanent magnet, means supporting the permanet magnet for rotation about an axis adjacent the switching means with the permanent magnet having two pairs of north and sourth poles with each of the poles of one pair lying on a line extending to the axis of rotation with an angle between the pair of lines being substantially 90° and the poles of the second pair being in mirror symmetry. In the preferred embodiment, the two switching means are disposed in parallel relationship on opposite sides of the axis of rotation of the permanent magnet and the permanent magnet is provided with two pairs of poles which are arranged in the symmetrical relationship so that in one position a pair of poles lies adjacent each of the switching means and a rotation of the permanent magnet through 90° places a pair of north poles adjacent one switching means and the pair of south poles adjacent the other switching element.

DESCRIPTION OF THE PREFERRED EMBODIMENT

The principles of the present invention are particularly useful in a control unit for an electronic apparatus which control units include a conductor means supporting inductively excitable switching means inside a housing which has means rotatably supporting a permanent magnet adjacent to the switching means. The housing supports a pole means relative to the magnet which pole means coacts with the poles of the magnet to retain the magnet in one of a plurality of predetermined rest positions and includes means for rotating the supporting means in a step-like manner to cause movement of the magnet in a step-like manner between the rest positions. While in one rest position, the permanent magnet induces the contact element of the switching means to become engaged or closed and when the magnet is rotated to the other rest position, the magnet enables the elements of the switching means to move to an unengaged or open position.

A detailed description of a control unit of the above type is disclosed in the u.S. Pat. application, Ser. No. 310,765 and this description is incorporated by reference thereto.

In the above described control unit, a permanent magnet 1 having a single pair of poles is mounted on a shaft 2 for rotation therewith. The shaft 2 extends between a pair of switching means or elements such as reed switches or contacts 3 to position the magnet adjacent thereto. Due to the construction of the pole means or pole pieces, the magnet has one rest position illustrated in FIG. 1 and a second rest position rotated 90° from the one rest position which second position is illustrated in FIG. 2. The shaft 2 is supplied with a control gear which coacts with a nose or pawl on a slide which is reciprocated by the actuating means to convert the linear movement of the slide into rotation movement of the shaft To step the magnet between the rest position illustrated in FIG. 1 to the rest position illustrated in FIG. 2 which are staggered by 90°, the pushbutton is depressed to rotate the shaft 90° in the direction of the arrow.

Figure 1:
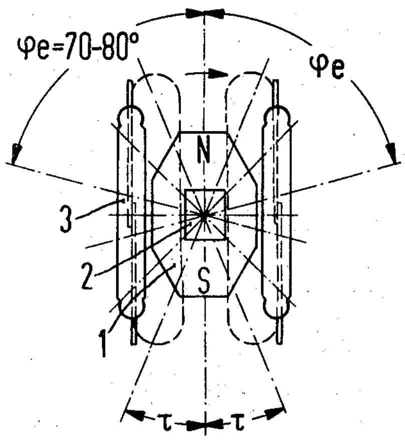
FIG. 1 is a schematic presentation illustrating the relationship of the permanent magnet with respect to a pair of excitable switching means when the magnet is in a first rest position causing engagement of the switching means.
Figure 2:
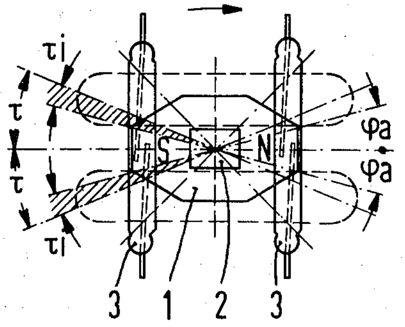
FIG. 2 illustrates the movement of the permanent magnet of FIG. 1 to a second position causing disengagement of the switching means.

When the permanent magnet 1 is in the rest position illustrated in FIG. 1 the magnetic field is shunted by the contact elements of the reed switches 3 and in the embodiment illustrated causes the contact elements to be held in a closed or engaged position. When the magnet is rotated to the rest position illustrated in FIG. 2, the poles of the magnet are positioned so that the magnetic field does not shunt through the contact elements of the reed switches 3 and the inherent resiliency of the contact elements cause the elements to be disengaged or opened.

As illustrated, due to the characteristics of the reed switches 3 that are presently used in an inductive switching system with a two pole permanent magnet, the closed or engaged state comprises a considerable larger angular distance than the disconnect or disengaged state. As illustrated, by moving from the position illustrated in FIG. 1 towards the position illustrated in FIG. 2, the contacts of the reed switches will remain in an engaged condition through an angle $\phi_e = 70°–80°$, and thus represents the connected or engaged state. The angle $\phi_a = 10°–20°$ and represents the disconnect state.

As the magnet 1 moves toward the position of FIG. 2, the coaction between the magnet and pole means will bring it to rest at the rest position. However, the magnet will tend to move past the rest position by an angle $\tau$ before the building up of the magnetic attraction therebetween takes effect to return the magnet to the rest position. Thus the magnet has a swinging or pendulum type movement of a decrease angular distance with the maximum angle of swing being $2\tau$. The angle $\tau$ is larger than the angle $\tau a$ for the disconnectied or unengaged state. The overlap of the angle $\tau$ with the angle $\phi_n$ is designed by angle $\tau_i$. While the poles of the magnet 1 are in the area of the overlap angle $\tau_i$, a faulty second impulse can be released. As mentioned above, the bounce back of the slide of the actuating means for the shaft 2 in conjunction with the overlap between the build up of angle $\tau$ and $\phi_a$ may cause the contact elements of the reed switches 3 to momentarily re-engage or connect when the permanent magnet is moved to the rest position denoting a disengaged or opened contact for the reed switches.

Figure 3:
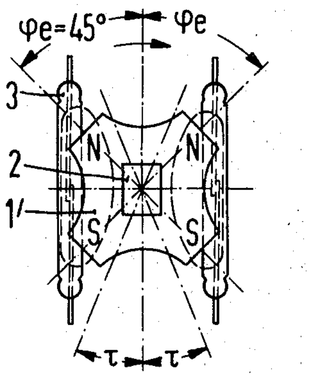
FIG. 3 is a schematic representation of the improvement of the present invention with the permanent magnet in a position causing engagement of the switching means.

The improvement of the present invention utilizes a permanent magnet 1' having two pairs of poles which are arranged in mirror symmetry to each other on opposite sides of the shaft 2 of the supporting means. The poles are distributed evenly on the periphery of the magnet and thus are circumferentially spaced 90° apart. As illustrated in FIG. 3, the angle $\phi_e$ for the connected or engaged state is approximately 45° and the angle $\phi_a$ is also approximately 45° for the disengaged state. Thus, the permanent magnet 1' causes the angle for the engaged or contact sate and the angle for the disconnected or disengaged state to be substantially equal and the angle $\phi_a$ is greater than the angle $\tau$ which represents the building up range of the permanent magnet when moving into a rest position relative to the pole pieces. In addition with the four pole permanent magnet 1', a greater magnetic field is applied to the reed switches 3 when the permanent magnet is moved into the engaging position such as illustrated in FIG. 3.

As illustrated in FIG. 3, the permanent magnet 1' is carried on the shaft 2 of the support means and is connected thereto by a key means such as a rectangular shaped shaft portion. One pair of the poles NS is assocated with each of the reed switches 3.

Figure 4:
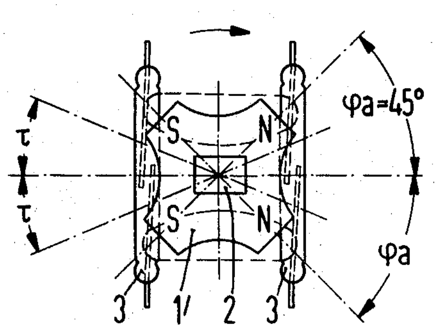
FIG. 4 illustrates the second position of the permanent magnet of FIG. 3 causing disconnection of the switching means or elements.

As illustrated in FIG. 4, after rotation of the permanent magnet 1' through 90° in the direction of the arrow, the two N poles are associated with one reed switch while the two S poles are associated with the other reed switch so that the inherent resiliency of the elements of each of the switches move to an unengaged or opened position. In the present invention utilizing the magnet 1', stepping of the magnet from the position illustrated in FIG. 3 to the position illustrated in FIG. 4 causes the reed switches to become open. Although the angle $\tau$, which represents the pendulum movement of the magnet relative to the pole pieces when coming to the rest position, is the same, it is less than the angle $\phi_a$. Thus even if the bounce or jump back of the slide during release of the actuating lever reinforces the pendulum movement, the angular range of the disengaged or open sate is sufficiently large to prevent an erroneous or false impulse due to a temporary reclosing of the contact elements of the reed switch 3. Thus, the improvement of the control unit by utilizing the permanent magnet 1' ensures the receiving of a single pulse while moving to the disconnect state for the reed switches 3 without the undesirable second or double pulse.

Although various minor modifications may be suggested by those versed in the art, it should be understood that I wish to employ within the scope of the patent warranted herein all such modifications as reasonably and properly come within the scope of my contribution to the art.

I claim:

1. In a control unit for an electronic apparatus such as in a matrix-forming operating field, the control unit including conductor means mounted within a housing and supporting inductively excitable switching means, means for mounting said housing and for connecting the switching means to an electronic circuit to be controlled thereby, means supporting a permanent magnet in operative adjacency to the switching means, pole means fixed with relation to the housing and related to the magnet to normally retain the magnet in predetermined rest positions, and means for rotating said supporting means in a step-like manner to effect movement of said magnet in a step-like manner between the rest positions and relative to said switching means to provide a magnetic shunt for exciting the switching means, the improvement comprising the permanent magnet having two pairs of poles which are arranged in mirror symmetry to each other relative to the support means, said poles being distributed evenly on the periphery of the permanent magnet.

2. A magnetically controlled switch unit comprising conductor means for supporting an inductively excitable siwtching element, a permanent magnet, means supporting the permanet magnet for rotation about an axis adjacent the switching means, said permanent magnet having a first and second pair of poles, each of said poles of the first pair lying on a line extending through the axis of rotation with the angle between the pair of lines being substantially 90°, and the poles of the second pair being in mirror symmetry to the first pair of poles.

3. A switch unit according to claim 2, which further includes a second inductively excitable switching element extending parallel to the first mentioned switching element on an opposite side of the axis of rotation for said magnet so that when the magnet is in one position relative to the switching elements, a pair of poles is adjacent to each of the switching elements which inductively shunts the field thereof and when the magnet is rotated 90° from one position, the switching means are unaffected by the field of the magnet.

* * * * *